Dec. 23, 1969  R. C. WEBSTER ET AL  3,485,055

CONTINUOUS FREEZER

Filed Sept. 18, 1964

INVENTORS
ROBERT C. WEBSTER
ALFRED H. SCHLEMMER, JR.

United States Patent Office 3,485,055
Patented Dec. 23, 1969

3,485,055
CONTINUOUS FREEZER
Robert C. Webster, Madison, Wis., and Alfred H. Schlemmer, Jr., Winter Haven, Fla.; said Webster assignor to Air Reduction Company, Incorporated, New York, N.Y., a corporation of New York
Filed Sept. 18, 1964, Ser. No. 397,377
Int. Cl. F25d *13/06*
U.S. Cl. 62—63     13 Claims

ABSTRACT OF THE DISCLOSURE

The invention relates to a continuous conveyor type cyrogenic freezing apparatus for freezing food products. The product to be frozen passes in sequence through pre-cooling, liquid immersion, tempering and post-cooling zones. The evolved vapors from the immersion zone are directed to the pre-cooling and post cooling zones to provide maximum utilization of the cooling effect of the cryogen.

---

Figure 1:
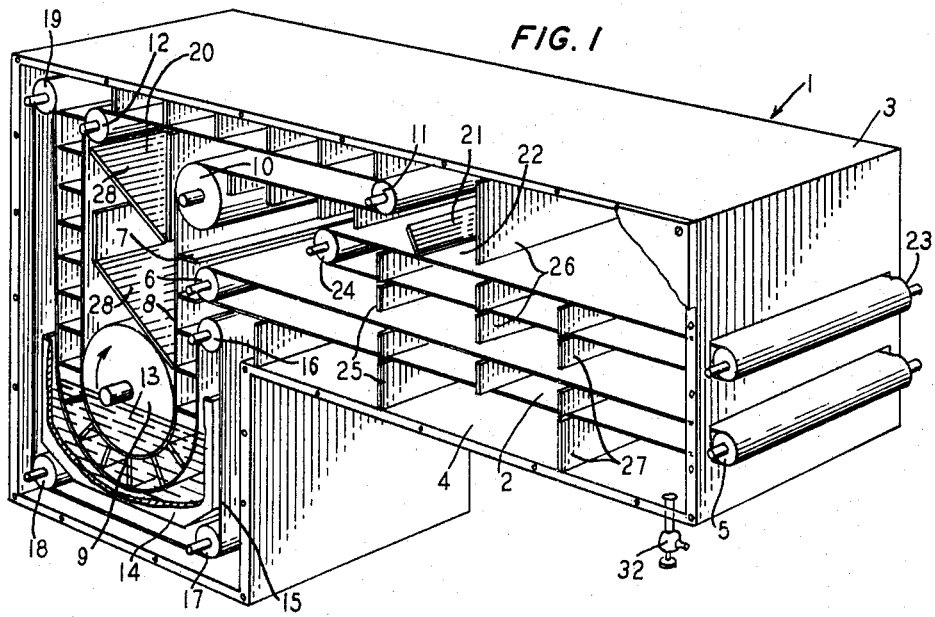

This invention relates to the process of rapid freezing of an article of food in which vapor evolving from the freezing media, which media is a liquid of cryogenic temperature, is utilized in efficient and effective pre-cooling and post-cooling.

More particularly, this invention relates to a process of rapid freezing of an article of food in which the freezing media is utilized in efficient manner in more than one state in a system for gently handling the article of food.

Furthermore, this invention relates to a food freezing machine of compact design which allows for rapid and economic freezing of an article of food as the result of immersion of said article in a liquid of cryogenic temperature.

More particularly, this invention relates to apparatus of compact design for the rapid and economic freezing of an article of food in which such articles are handled in a gentle manner so as not to be cracked, split, or otherwise destroyed during movement through various stages of freezing in the apparatus.

A cryogenic temperature is a temperature of about —100° F. or less.

A number of different methods have been employed to preserve articles of food. Food preserving techniques such as drying, canning, preserving in syrups, etc., have long been known to the industry. These techniques, however, do not result in an article of food which has taste or product characteristics similar to those characteristics before the preservation technique was employed. Furthermore, such techniques are costly and not appealing to the consumer.

In recent years, preservation of food as a result of freezing has been adopted.

It has been proposed in the past to freeze food products in brine solutions; however, freezing of food products in brine is relatively slow, results in damaging crystal growth, the problems resulting therefrom discussed below, and often lends to the food products an undesirable taste or odor.

In the preservation of articles of food, the blast tunnel method of freezing is well known. According to this method, the food article generally is frozen by subjecting it to a sub-freezing gaseous blast in a "tunnel," with a moving or still cold environment for a substantial period of time to freeze the article solidly throughout. This conventionally requires freezing times up to several hours. The article is generally subjected to either manual handling or handling on conveyors, for example during the lengthy period for freezing, and this handling leads to breakage. While this blast tunnel freezing is often referred to as "quick freezing," a substantial period of time is required for freezing and there is a substantial cell destruction as the result of crystal growth within the article during the freezing period. This crystal growth often results in the destruction of the delicate construction of the food article. It is characteristic for articles of food frozen according to the blast tunnel technique to split and to lose a large percentage of their juices during thawing, not only altering the construction of the article, but its net weight.

There have been a number of proposals as to methods of and apparatus for the rapid freezing of articles of food as a result of heat exchange contact with a media of cryogenic temperature. Such apparatus included structures for direct immersion of food articles in a cryogenic liquid (immersion freezing), for spraying food articles with a cryogenic liquid (spray freezing). Rapid freezing of articles of food as a result of heat exchange contact with a cryogenic media is desirable, as compared to other refrigeration techniques, because in brief, the extremely rapid freezing of the article does not allow time for the occurrence of the damaging crystal growth, within the article of food which occurs when food articles are frozen by slower conventional methods, as described hereinbefore. The extremely rapid freezing of the article of food occurs as a result of heat exchange between the article and the media of cryogenic temperature (liquid nitrogen, for example, at a temperature of —320° F.).

In order to economically freeze articles of food with a cryogenic media, such as nitrogen liquid and the evolved nitrogen vapor therefrom, efficient use of the cryogenic media must be employed.

The many structures proposed in the past, for freezing articles of food as a result of heat exchange contact with a media of cryogenic temperature have suffered from various drawbacks; for example, such structures are damaging to the articles of food being frozen because, for example, of poor handling of articles, or are uneconomic in operation, usually due to inefficient and incomplete utilization of the cryogenic media. In order to significantly improve the rapid freezing of food articles as a result of contact with a cryogenic media, as by spray or immersion freezing and contact with gas evolved therefrom, it is necessary to improve over the prior methods of the apparatus for such rapid food freezing by making more economic the utilization of the cryogenic media in its different states, as well as providing for the handling of the food articles in a gentle manner so as to reduce loss.

It is an object of this invention to provide a method of economic utilization of the media of cryogenic temperature used in the rapid freezing of food products.

It is further an object of this invention to provide an improved apparatus for rapidly freezing articles of food which results in efficient utilization of the media of cryogenic temperature used to freeze the food as well as in such handling of the articles so that they will not be damaged but will retain the high quality associated with cryogenic liquid freezing.

It is further an object of this invention to provide a method of and apparatus for rapidly freezing articles of food which allows for utilization in an economical manner of a cryogenic media in more than one state thereof, as well as gentle handling of the articles of food frozen.

Other objects and advantages of this invention will be stated or become evident in connection with the following description.

In general, the article of food to be frozen is first cooled by off-gas vapor from a cryogenic liquid, to be discussed hereinbelow. This pre-cooling before freezing serves to firm the article so that it will be less susceptible to damage during movement along the freezing process. Said use of the off-gas vapor for pre-cooling has the further advantage of lowering the temperature of the article of food, so as to contribute to the overall freezing process. The article of food is next immersed or sprayed, depending on the freezing requirement of the article of food, with a liquid of cryogenic temperature in order to rapidly freeze said article. After immersion and/or spray, the article of food is subjected to the off-gas vapor of said liquid. The vapor, by design, is taken from its boiling point, $-320°$ F., and utilized for cooling to the desired exit temperature of $0°$ F. At the time of such subjection, the article may be either partially or completely frozen. The temperature throughout the article of the food begins to equilibrate while being subjected to said off-gases, without the outside surface temperature of the article exceeding a chosen limit, as the result of the utilization of said off-gas vapor. The article then equilibrated progresses in a dead space environment, that is, where there are no off-gas vapors from the cryogenic liquid. The dead space environment contributes to the equilibration by allowing raising of the severe surface temperature of the article of food ranging from $-320°$ F. to $-200°$ F. therefore resulting in a more uniform post-cooling. The article is then once again subjected to off-gas vapors of said liquid during which time equilibration is completed with the outside surface temperature of the article below a maximum limit. Packaging or other desired operation then may follow.

Apparatus for effecting the rapid freezing of an article of food as described above is illustrated in the following drawings.

Figure 2:
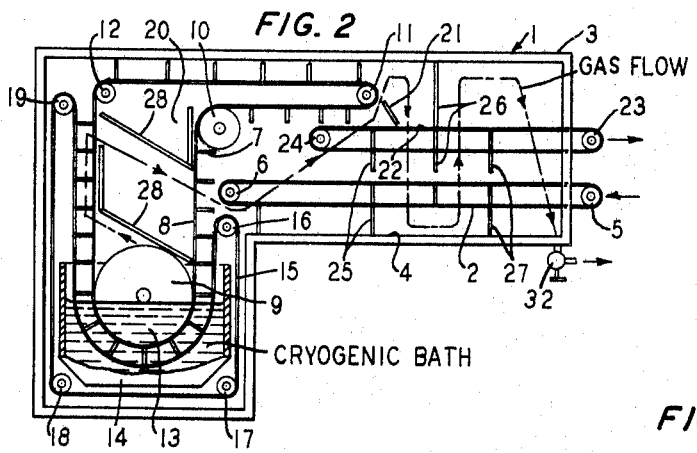
Figure 5:
Figure 4:
Figure 3:
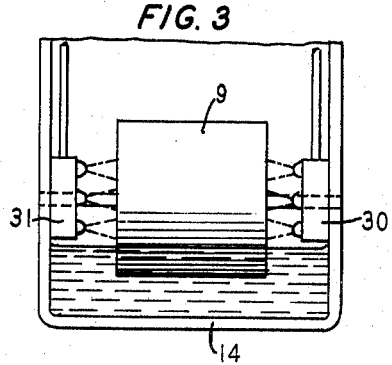

FIGURE 1 shows a plan view of food freezing apparatus according to this invention; and FIGURE 2 shows in particular the movement through the apparatus of the vapor evolving from the liquid of cryogenic temperature which makes up an immersion bath; and FIGURE 3 is a plan view of a part of the freezer showing spray apparatus; and FIGURE 4 is a detailed view of a conveyor belt construction; and FIGURE 5 is a detailed view of a perforated plate construction.

Like numerals in the figure views indicate the same structure.

The freezing apparatus is shown generally at 1 in FIGURE 1. Conveyor means 2 mounted within the casing 3 of the apparatus 1 moves the articles of food (not shown) through a first area 4, which is the area of pre-cooling. The conveyor means 2 is shown as mounted on pulley and drive structure 5 and 6, and may, for example, be made of a stainless steel mesh belt as shown for example in FIGURE 4, or of other materials desired. The means for moving the conveyor belt 2 is not a part of this invention. The article of food progresses on the conveyor means 2, on which it may be sprayed with cryogenic liquid, if desired (not shown), until deposited on a feed plate 7, which, once again, may be made of perforated stainless steel, as shown for example in FIGURE 5, or of other desired materials. The feed plate 7 is attached to the conveyor means 8, which may be of the same construction as conveyor means 2, as may all other conveyor means defined hereinafter. Said conveyor means 8 is shown as mounted on the drum structure 9, 10, 11, and 12, shown only for illustrative purposes. The conveyor means 8 moves the articles of food through the immersion bath 13, found in the lower compartment 14 of the apparatus. An article of food containing compartment is made up by the conveyor means 8, the plates 7, and the conveyor means 15 mounted on the pulley of drive drum structure 16, 17, 18, and 19, shown again only for illustrative purposes. The transfer from the conveyor means 2 to the plate 7 and holding of the food article in the pocket just described results in a gentle handling of the food article, which gentle handling insures a lack of breakage to delicate food articles such as broccoli or raspberries. The movement of the two conveyor means, that is, the conveyor means 8 and the conveyor means 15, at the same speed eliminates sheer damage of the food article.

The article is conveyed at a pre-determined speed through the liquid at cryogenic temperatures in immersion bath 13, which liquid may, for example, be liquid nitrogen; the speed of the drive through the liquid of the immersion bath being variable, as is the depth of the liquid.

The article of food after being conveyed through the liquid of the immersion bath in the direction of rotation indicated on the drum 9 of FIGURE 1, moves upward in the pocket described previously.

While moving in an upward direction just described, the article of food in the pocket is post-cooled, or subjected to off-gas vapors evolving from the liquid of cryogenic temperature, the article of food equilibrating while the outside surface thereof is maintained below a maximum desired temperature. The article of food then is transported in the pocket formed by the conveyor means 8, the plates 7 and the casing 3 at the top of the apparatus, in the dead space area generally indicated at 20, into which no off-gas vapors evolved from the liquid at cryogenic temperature penetrate. Equilibration of the temperature of the article of food in this dead space takes place. The severe surface temperature of the article of food is raised by equilibration and the inner temperature of the article is lowered. This tempering or equilibration takes place outside of the cold off-gas atmosphere, thus allowing a more uniform and moderate equilibration before being subjected again to the post-cooling atmosphere, than would be obtained by straight off-gas post-cooling. Since the off-gas vapor is warming up as it post cools and later pre-cools the food article, the dead space equilibration contributes to more efficient and prolonged utilization of the off-gas vapor. The article of food is then conveyed across suitable structure such as dead plate 21 on the conveyor means 22, suitably mounted on pulley or drive structure 23 and 24, for example, into a second environment of off-gas vapors evolving from the liquid at cryogenic temperature, for equilibration and maintenance of a particular surface temperature.

The articles of food are discharged from said conveying means 22 from the freezing apparatus at a point near but independent to the point of entry on conveyor belt 2.

During said rapid freezing operation just described the article of food has been conveyed in a gentle manner for pre-cooling, supplemental spray freezing to increase pre-cooling, as previously described, immersion bath freezing with a cryogenic liquid (or optionally including spray freezing for the immersion freezing shown) and post-cooling at two independent and separate points with off-gas vapors of said cryogenic liquid. Effective and rapid freezing of the food articles has thus been effected with economic use of the cryogenic media of two states in an efficient unit wtih gentle handling of the articles of food being frozen.

As can be seen in FIGURE 2, efficient use of the evolved vapors from the immersion bath liquid or cryogenic temperature is an important feature in the apparatus just described. The evolved off-gas vapors move through the apparatus (note the heavy line) so as to first post-cool the articles of food just immersed and/or sprayed with cryogenic liquid, then move as the result of the bevel or plenum structure (a reservoir of channel to control the movement of a liquid or gas) 28 to pre-cool the articles of food just before they move into the pocket structure. The vapor rises as the result of the use of standard pressure differential structure, such as baffles, ducts, and/or exhaust fans, shown for example in FIGURE 1 as exhaust fan 32 to draw the vapor from the point at which it is evolved so as to post cool articles emerging from the dead space area. The vapor then moves as the result of its own density characteristics and the placement of further pressure differential structure as described above, including baffle structure 26, into the pre-cool area and then back into the post-cool area as the result of the placement of further pressure differential structure including baffle structure 27, and then back into the pre-cool area, as shown in FIGURE 2. This movement of the vapor results in a highly efficient utilization of the refrigeration found in the vapor. Since the defined exit temperature of the evolved vapor is 0° F., the refrigeration value of the evolved off-gas vapor from the cryogenic liquid will be utilized from the temperature of the cryogenic liquid, in the case of nitrogen —320° F. to 0° F.

As stated earlier, if desired, a spray header, shown for example at 30 and 31 in FIGURE 3, emitting cryogenic liquid may be utilized instead of the immersion bath of liquid of cryogenic temperature shown in the figures described above; said spray header depositing spray on the fod articles as they move on the drum 9 in the pocket between belts and plate through the immersion chamber 14 shown in FIGURE 3. Furthermore, as previously described, a spray header may be added to the pre-cool area 4 shown in FIGURE 1, if desired.

The apparatus described provides for efficient and effective pre-cooling and post-cooling. The apparatus described which may be easily maintained, as by celaning, is contained in one housing thus reducing heat losses and increasing efficiencies. The gentle transfer of articles of food from one part of the apparatus to another described results in little damage or breakage. These advantages result in a highly beneficial structure for performing the method of rapid freezing described.

The particular details of the apparatus and method of rapid freezing described above in relation to the drawings is not meant to limit the scope of protection; rather, it is intended that said scope of protection be limited only by the following claims.

We claim:
1. A process for the rapid freezing of food articles without damage which includes contacting the food articles with liquid nitrogen to at least partially freeze the articles, the improvement in which process comprises, sequentially precooling the food articles with at least part of said vapor nitrogen with vapor evolved from said liquid to begin temperature equilibration throughout the articles and then precooling the food articles with at least part of said vapor to firm the articles and lower the temperaure thereof before the food articles contact the liquid so as to efficiently utilize the refrigeration capacity of the liquid and the vapor evolving therefrom.

2. The process as set forth in claim 1 in which substantially all of the vapor evolved from the liquid is used to post-cool the food articles and then pre-cool the food articles.

3. A process for the rapid freezing of articles of food in which the articles are contacted with liquid nitrogen, the improvement comprising utilizing vapor evolved from the liquid nitrogen to post-cool the articles after contact of the articles with said liquid, providing a dead space devoid of evolved vapor and liquid, moving said articles through said dead space so as to allow for temperature equilibration of the articles, further post-cooling the articles with said vapor evolved from said liquid after said movement through said dead space, then further utilizing said vapor by pre-cooling articles of food with said vapor before said articles contact said liquid nitrogen, and then alternately post-cooling articles with said vapor after said articles contact said liquid and pre-cooling articles with said vapor before said articles contact said liquid in order to effectively use the vapor evolving from the liquid.

4. A process for the rapid freezing of food products which includes contacting the food product with liquid nitrogen the improvement in which process comprises sequentially post-cooling the food product after contact with the liquid nitrogen with a vapor evolved from said liquid and then directing the evolved vapor so as to alternately pre-cool the food product before contact with the liquid and post-cool the food product after contact of the product with the liquid so as to efficiently utilize the refrigeration capacity of the liquid and the vapor evolving therefrom.

5. A rapid freezing process comprising the steps of pre-cooling a food article with vapor revolved from liquid nitrogen, contacting said food article with said liquid nitrogen, post-cooling said article with vapor evolved from said liquid nitrogen, providing a dead space devoid of evolved vapors and liquid moving said article through said dead space so as to allow for temperature equilibration of the artcile, and then again post-cooling said article with vapor evolved from said liquid nitrogen.

6. The process as set forth in claim 1, in which the contact with the liquid nitrogen is effected by immersing the food article in a bath of said liquid.

7. The process as set forth in claim 1 in which the contact with the liquid nitrogen is effected by spraying the food article with said liquid.

8. A continuous rapid freezer for freezing articles of food comprising a conveying means for transporting said food articles during pre-cooling thereof, an immersion bath of liquid nitrogen, second conveying means transporting said food articles from said first conveying means through said immersion bath, a portion of said second means moving away from said immersion bath for transporting said articles during post-cooling thereof by a vapor evolved from said immersion bath, means providing a dead space devoid of said evolved vapor or said liquid, a portion of said second conveying means moving away from said immersion bath not being post-cooled by said evolved vapor for transporting said articles through said dead space, third conveying means moving said food articles from said second conveying means to a point of discharge, and baffle means located within said freezer for directing the movement of the evolved vapor in order that said vapor post-cools said food articles on said third conveying means and pre-cools said food articles on said first conveying means.

9. The freezer as set forth in claim 8, said second conveying means comprised of perforated plates serving as trays to hold said food articles and moving at one point in close proximity to said first conveying means to effect a gentle transfer of the food articles from said first conveying means to said second conveying means, and two additional moving conveying means moving in the same direction with said plates making up pocket structure which surrounds said food articles and retains said articles in position while said food articles are immersed, initially post-cooled with the evolved vapor and transported to the dead space.

10. The immersion freezer as set forth in claim 9, said first, second and third conveying means being a mesh structure, and fan means mounted in said freezer for augmenting the movement of said vapor.

11. A freezer for efficient freezing and gentle handling of an article of food to be frozen, comprising a conveying means transporting said food article carried thereon toward contact with liquid nitrogen, baffle means for directing a vapor evolving from said liquid nitrogen upon said article to pre-cool said article, second conveying means transporting said article from said first conveying means into contact with said liquid, a portion of said second means moving away from said liquid additional baffle means for directing said evolved vapor upon said article to post-cool said article while said article is transported by said last named portion, means providing a dead space in said freezer devoid of evolved vapor and nitrogen liquid, said second conveying means moving away from said liquid for transporting said article through said dead space for equilibration of the article, third conveying means moving said article away from said second conveying means to a point of discharge from the freezer, still additional baffle means for directing said evolved vapor upon said article for post-cooling said article while said article is transported on said third conveying means, said second conveying means comprised of perforated plates serving as trays to hold said article, said trays moving at one point in close proximity to said first conveying means to effect gentle transfer of the article from said first conveying means to said second conveying means, two moving belts moving in the same direction which with said plates make up pocket structure which surrounds said article and retains it in position while said article is moved through (1) said liquid, (2) said first-mentioned post-cooling evolved vapor and (3) into said dead space, said first, second and third conveying means being a mesh structure and fan and baffle structure, augmenting movement of the vapor.

12. The continuous freezer as set forth in claim 11, the liquid being collected in an immersion bath.

13. The continuous freezer as set forth in claim 11, the liquid being in the form of a spray of liquid nitrogen.

References Cited

UNITED STATES PATENTS

| | | | |
|---|---|---|---|
| 3,413,818 | 12/1968 | Pelmulder | 62—63 |
| 2,234,157 | 3/1941 | Jones | 62—320 X |
| 2,609,150 | 9/1952 | Bludeau | 62—320 X |
| 2,447,249 | 8/1948 | Hill | 62—63 |
| 2,454,704 | 11/1948 | McMichael | 62—63 |
| 3,022,636 | 2/1962 | Morrison | 62—64 |
| 3,048,989 | 8/1962 | Morrison | 62—64 |
| 3,250,630 | 5/1966 | Webster et al. | 99—193 |
| 3,255,608 | 6/1966 | Macintosh | 62—380 X |
| 3,258,935 | 7/1966 | Ross | 62—64 X |
| 3,277,657 | 10/1966 | Harper et al. | 62—374 X |
| 3,298,188 | 1/1967 | Webster et al. | 62—63 |

WILLIAM E. WAYNER, Primary Examiner

U.S. Cl. X.R.

62—65

PO-1050
(5/69)

UNITED STATES PATENT OFFICE
CERTIFICATE OF CORRECTION

Patent No. 3,485,055        Dated December 23, 1969

Inventor(s) Robert C. Webster and Alfred H. Schlemmer, Jr.

It is certified that error appears in the above-identified patent and that said Letters Patent are hereby corrected as shown below:

Column 3, line 70, "of" should read --or--

Column 4, line 6, "temperatures" should read --temperature-- line 58, "wtih" should read --with-- line 61, "or" should read --of--

Column 5, line 19 "fod" should read --food-- line 43, "precooling" should read --postcooling-- line 43, after "articles" should be inserted

--after contact with the liquid-- and after "articles" should be cancelled

--with at least part of said vapor--

Column 6, line 13 "artcile" should read --article-- .

SIGNED AND
SEALED
JUN 3 0 1970

(SEAL)
Attest:

Edward M. Fletcher, Jr.
Attesting Officer

WILLIAM E. SCHUYLER, JR.
Commissioner of Patents